(12) United States Patent
Baldemair et al.

(10) Patent No.: US 9,603,091 B2
(45) Date of Patent: Mar. 21, 2017

(54) REDUCING PERIODIC REPORTING IN DISCONTINUOUS RECEIVE (DRX) MODE (71) Applicant: TELEFONAKTIEBOLAGET L M ERICSSON (PUBL), Stockholm (SE)

(72) Inventors: Robert Baldemair, Solna (SE); Mattias Bergström, Stockholm (SE); Mikael Wittberg, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 243 days.

(21) Appl. No.: 14/396,097

(22) PCT Filed: Feb. 14, 2013

(86) PCT No.: PCT/SE2013/050127
§ 371 (c)(1),
(2) Date: Oct. 22, 2014

(87) PCT Pub. No.: WO2013/162439
PCT Pub. Date: Oct. 31, 2013

(65) Prior Publication Data
US 2015/0117284 A1 Apr. 30, 2015

Related U.S. Application Data

(60) Provisional application No. 61/637,369, filed on Apr. 24, 2012.

(51) Int. Cl.
*H04W 52/02* (2009.01)
*H04W 76/04* (2009.01)
(Continued)

(52) U.S. Cl.
CPC ....... *H04W 52/0216* (2013.01); *H04L 1/0026* (2013.01); *H04L 1/0027* (2013.01);
(Continued)

(58) Field of Classification Search
CPC ... H04L 1/0026; H04L 1/0027; H04L 5/0082; H04L 5/0048; H04L 5/001; H04W 76/048; H04W 52/0216
See application file for complete search history.

(56) References Cited

U.S. PATENT DOCUMENTS

2012/0069782 A1 3/2012 Kuo et al.

FOREIGN PATENT DOCUMENTS

EP 2104276 A1 9/2009

OTHER PUBLICATIONS

TSG-RAN WG2 #77bis, "Periodic CSI and SRS at DRX state change," Mar. 26-30, 2012, 3GPP.*
(Continued)

*Primary Examiner* — Jae Y Lee
(74) *Attorney, Agent, or Firm* — Patents on Demand P.A.; Brian K. Buchheit; Scott M. Garrett (57) ABSTRACT

Techniques for avoiding or reducing unnecessary CSI and/or SRS transmissions in a wireless communications system. In an example method, a user terminal periodically transmits (620) CSI and/or SRS according to corresponding periodic CSI transmission opportunities or periodic SRS transmission opportunities, or both, during a first period in which the UE is operating according to a short DRX cycle. In a second period immediately following the first period and during which the user terminal is operating according to a long DRX cycle, the user terminal reduces or suppresses (630) periodic transmissions of CSI and/or SRS. This may be done, for example, by suppressing periodic transmission of CSI and/or SRS, after a first delay time or first delay times or by reducing the rate of transmission of CSI and/or SRS, after a second delay time or second delay times. A combination of these and other disclosed approaches may be used.

18 Claims, 8 Drawing Sheets

(51) Int. Cl.
  *H04L 1/00* (2006.01)
  *H04L 5/00* (2006.01)
(52) U.S. Cl.
  CPC .......... *H04W 76/048* (2013.01); *H04L 5/001* (2013.01); *H04L 5/0048* (2013.01); *H04L 5/0082* (2013.01)

(56) References Cited

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.5.0, Mar. 2012, 1-54.
Unknown Author, "Periodic CSI and SRS at DRX state change", 3GPP TSG-RAN WG2 #77bis, Tdoc R2-12XXXX, Source: Ericsson, ST Ericsson, Jeju, Korea, Mar. 26-30, 2012, 1-9.
Unknown Author, "RRC_Connected DRX and dedicated UL resource release", 3GPP TSG RAN WG2 #61, R2-081157, Source: NTT DoCoMo, Inc., Sorrento, Italy, Feb. 11-15, 2008, 1-5.

\* cited by examiner

REDUCING PERIODIC REPORTING IN DISCONTINUOUS RECEIVE (DRX) MODE

RELATED APPLICATIONS

This application claims the benefit of and priority to U.S. Provisional Patent Application Ser. No. 61/637,369, filed 24 Apr. 2012. The entire contents of the foregoing U.S. Provisional Patent Application are incorporated herein by reference.

BACKGROUND

DRX in LTE Systems

Industry standards for the Long-Term Evolution (LTE) wireless communication system, as developed by the $3^{rd}$-Generation Partnership Project (3GPP), include specifications for the implementation of a Discontinuous Receive (DRX) mode of operation for user terminals ("user equipment," or "UEs," in 3GPP terminology) that have established a connection with the radio network and are thus in a so-called RRC_CONNECTED state. More particularly, the requirements for DRX operation are described in section 5.7 of the Medium Access Control (MAC) layer specifications in the 3GPP document "Evolved Universal Terrestrial Radio Access (E-UTRA); Medium Access Control (MAC) protocol specification," 3GPP TS 36.321, v. 10.5 (March 2012).

The purpose of DRX is to allow the UE some sleep time, i.e., time during which it does not have to monitor the Physical Downlink Control Channel (PDCCH) for new transmissions. The time during which the UE must monitor the PDCCH is called Active Time—when UE is not in an Active Time it does not have to monitor the PDCCH. The Radio Resource Control (RRC) protocol defined by 3GPP documents is used to activate the DRX mechanism for a given UE and defines the periods when the UE is in Active Time.

The Active Time includes time when at least one of the following conditions is fulfilled:

- When the On Duration Timer is running. In the beginning of each DRX cycle, the On Duration Timer defines how long the UE should monitor PDCCH and be active. There are two types of DRX cycles, long DRX cycles and short DRX cycles. Short cycles are followed only when there has recently been uplink or downlink activity, while long cycles are used otherwise. In the discussion that follows, the term "OnDuration time" refers to the time during which the On Duration timer is running.
- When the Inactivity Timer is running. When the PDCCH indicates a new transmission in either the downlink or uplink, i.e., a downlink assignment or uplink grant, the Inactivity Timer is started, or re-started if it is already running.
- When a Scheduling Request is pending. After sending a Scheduling Request, which is a request for uplink resources, the UE expects the base station (an "eNodeB" or "eNB," in 3GPP terminology) to schedule it and to send an uplink grant on PDCCH.
- When the Retransmission Timer is running. LTE uses hybrid automatic-repeat-request (HARQ) in both the downlink and uplink. In the LTE downlink, retransmissions are asynchronous and are thus not always completed one HARQ round trip time (RTT) after the previous transmission. (This is different than the HARQ behavior for the uplink.) Thus, when the UE receives a downlink transmission, it starts a DL HARQ RTT Timer for the current HARQ process. When this timer expires, the Retransmission Timer of the HARQ process is started and the UE monitors the PDCCH for incoming assignments. The Retransmission Timer is started only when the UE has not been able to decode downlink data targeted to the UE, and has thus sent a negative acknowledgement (NACK) in the uplink.
- When an uplink grant for a retransmission may occur. In LTE, the eNB may send a new uplink resource allocation together with the synchronous HARQ feedback, with the new uplink resource allocation specifying the uplink resources to be used for the retransmission. Note that during this subframe, which occurs 4 milliseconds after the initial uplink transmission, the UE should monitor not only the PDCCH, for uplink grants, but also the Physical Hybrid Indicator Channel (PHICH), for the HARQ feedback.
- When an uplink grant is expected after receiving a Random Access Response, or when the Contention Resolution Timer is running.

Note that regardless of Active Time, the UE should transmit or receive HARQ feedback when either is expected. Note also that in LTE networks that employ Time-Division Duplexing (TDD), the PDCCH subframe can be a normal downlink subframe or a special subframe, the latter of which includes a downlink part referred to as DwPTS. An uplink-only subframe in a TDD deployment cannot be a PDCCH subframe.

DRX in Systems Using Carrier Aggregation

In systems using a technique called carrier aggregation, one or more component carriers are aggregated together for a single UE, to provide wider bandwidth up to 100 MHz and higher bit rates, up to 3 Gigabits per second. In an LTE system employing carrier aggregation, a UE has one primary serving cell (PCell) and one or more secondary serving cells (SCells). Using RRC, the network configures, for each UE, which cell is acting as the UE's PCell and which cell or cells are acting as the UE's SCells. A configured SCell can be dynamically activated or deactivated, as needed. This allows additional bandwidth to be made available to the UE when needed, while allowing power consumption by the UE to be reduced when the additional carriers are not needed. The activation state is controlled by MAC Control Elements (MAC CEs) and timers. In Release 10 of the 3GPP standards for LTE, cross-carrier scheduling was also introduced, meaning that one cell may carry scheduling information on PDCCH for another cell. Which serving cell is scheduling a serving cell is configured semi-statically, using RRC.

In LTE Release 10, there is only one DRX mechanism, which includes one set of DRX timers common to all carriers/cells. This means that, when in DRX Active Time, the UE shall monitor the PDCCH of all activated serving cells. Furthermore, if, for example, the DRX-Inactivity-Timer is started in response to activity on one cell, the UE needs to monitor PDCCH on all serving cells.

CSI Reporting in LTE

In specifications for LTE, the term Channel State Information (CSI) is used as shorthand for control information that may include a Channel Quality Indicator (CQI), a Precoding Matrix Indicator (PMI), a Rank Indicator (RI) and a Precoding Type Indicator (PTI). CSI is used by the UE to provide channel quality estimations for the eNB.

CSI can be sent both as aperiodic and periodic control signals. Aperiodic CSI reports are always in response to an explicit request from the eNB, and are sent together with user data on the Physical Uplink Shared Channel (PUSCH). Periodic CSI reports are configured by RRC, to be sent periodically during the Active Time of the UE. Periodic CSI reports can be sent either on PUSCH, together with user data, or sent on the Physical Uplink Control Channel (PUCCH).

SRS Transmission in LTE

The sounding reference signal (SRS) is a reference signal sent by the UE in the uplink, and is used by the eNB to estimate the uplink channel quality. SRS can be sent both aperiodically or periodic. Aperiodic transmission of SRS is always in response to a request from the eNB. Periodic transmission of SRS is according to RRC configuration of the UE, and is sent periodically during the Active Time of the UE.

The use of carrier aggregation in systems that employ DRX causes additional complications for DRX, and may reduce the effectiveness of DRX. One reason for this is that a single DRX mechanism applies to all activated carriers. Improved techniques for managing transmissions during DRX mode are needed.

SUMMARY

The techniques described herein may be used to avoid or reduce sending of periodic CSI and/or SRS signals by a user terminal in a wireless communications system. Reducing the transmission of periodic CSI and/or SRS signals will improve the battery life of the user terminal and decrease unnecessary interference to transmissions to and/or from other user terminals. According to some of the techniques described in detail below, a user terminal does not send periodic CSI/SRS at all when the user terminal is in long DRX cycle. In other embodiments, the sending of CSI and/or SRS during long DRX cycle is reduced, using one or more of several techniques that include delaying the periodic sending of CSI and/or SRS, reducing the rate of periodic transmission opportunities for CSI and/or SRS, and suppressing the periodic transmission of CSI and/or SRS after a defined delay.

In several embodiments of the techniques detailed below, these problems are addressed by adapting a user terminal to carry out a method wherein the user terminal periodically transmits CSI or SRS, or both, according to corresponding periodic CSI transmission opportunities or periodic SRS transmission opportunities, or both, during a first period in which the UE is operating according to a short DRX cycle, and, in a second period immediately following the first period and during which the user terminal is operating according to a long DRX cycle, reduces or suppresses periodic transmissions of CSI or SRS or both. In various embodiments, this reducing or suppressing of periodic transmissions may include one or more of: (i) suppressing periodic transmission of CSI or SRS or both; (ii) suppressing periodic transmission of CSI or SRS or both, after a first delay time or first delay times; (iii) periodically transmitting CSI or SRS or both according to a reduced rate of periodic CSI transmission opportunities or reduced rate of periodic SRS transmission opportunities or both; or (iv) reducing the rate of transmission of CSI or SRS or both, after a second delay time or second delay times. A combination of two or more of these approaches may be used to reduce the rate of transmission of CSI or SRS, or both.

In some embodiments, the reducing or suppressing of the periodic transmissions of CSI and/or SRS is preceded by the receiving of CSI/SRS configuration information. This CSI/SRS configuration information may specify one or more of the following, for example: a delay time for starting periodic CSI transmission opportunities during DRX long cycles; a delay time for starting periodic SRS transmission opportunities during DRX long cycles; a delay time for starting periodic CSI transmission opportunities during DRX short cycles; a delay time for starting periodic SRS transmission opportunities during DRX short cycles; a period for periodic CSI transmission opportunities, for use during DRX long cycles; a period for periodic SRS transmission opportunities, for use during DRX long cycles; a period for periodic CSI transmission opportunities, for use during DRX short cycles; and a period for periodic SRS transmission opportunities, for use during DRX short cycles. In some cases, the configuration information received by the user terminal may include or consist of signaling that indicates that reduced CSI or SRS transmission should be enabled, where the user terminal operation during the second period is responsive to said signaling.

In some embodiments, periodic transmission of CSI or SRS or both is suppressed during the second period, beginning at a specified time X after the user terminal has entered the long cycle and continuing for as long as the user terminal remains in the long cycle. In some of these embodiments, periodic transmission of CSI is suppressed beginning at the specified time X after the user terminal has entered the long cycle, while periodic transmission of SRS is suppressed beginning at a specified time X_SRS after the user terminal has entered the long cycle, where X_SRS differs from X The specified time X and/or X_SRS may be specified in terms of at least one of the following, for example: a number of subframes; a number of subframes during which the user terminal is in an Active Time state; and a number of times that the user terminal is in an Active Time state after entering the long cycle.

The user terminal generally returns to operation according to the short DRX cycle in a third period immediately following the second period. During this third period, in some embodiments, the user terminal periodically transmits CSI or SRS, or both, according to corresponding periodic CSI transmission opportunities or periodic SRS transmission opportunities, or both, at a rate or rates used in the first period. In some embodiments, the periodic transmission of CSI or SRS or both, during the third period, is delayed by a second delay time or second delay times. For example, the user terminal may begin periodic transmission of CSI or SRS, or both, beginning at a specified time Y after entering the short cycle and for as long as the user terminal remains in the short cycle. In some of these embodiments, periodic transmission of CSI begins at the specified time Y after the user terminal has entered the short cycle, while periodic transmission of SRS begins at a specified time Y_SRS after the user terminal has entered the short cycle, where Y_SRS differs from Y. The specified time Y and/or Y_SRS may be specified in terms of at least one of the following, for example: a number of subframes; a number of subframes during which the user terminal is in an Active Time state; and a number of times that the user terminal is in an Active Time state after entering the short cycle.

In any of the embodiments described above, CSI may be transmitted at a first periodicity during the second period and at a second periodicity, differing from the first periodicity, during the third period. Likewise, SRS may be transmitted at a third periodicity during the second period and at a fourth periodicity, differing from the third periodicity, during the third period.

A variant of the process summarized above includes periodically transmitting CSI or SRS, or both, according to corresponding periodic CSI transmission opportunities or periodic SRS transmission opportunities, or both, during a first period in which the user terminal is operating according to a short DRX cycle. These transmissions take place at a first rate or rates, depending on whether the CSI and SRS transmission opportunities are scheduled with the same periodicity. In a second period, immediately following the first period, the user terminal is operating according to a long DRX cycle, and reduces or suppresses periodic transmissions in the second period by periodically transmitting CSI or SRS, or both, during a first part of the second period, at a rate or rates previously used in the first period. In a second portion of the second period, the user terminal periodically transmits CSI or SRS, or both, at a reduced rate or rates compared to the rate or rates previously used in the first period. In some of these embodiments, in a third period immediately following the second period and during which the user terminal is again operating according to a short DRX cycle, the user terminal periodically transmits CSI or SRS, or both, at the reduced rate or rates for a first portion of the third period. In a second portion of the third period, the user terminal returns to periodically transmitting CSI or SRS, or both, at the rate or rates previously used in the first period.

Corresponding user terminal apparatus adapted to carry out these methods follow directly from the above and are described in detail below. Of course, the techniques and apparatus described herein are not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
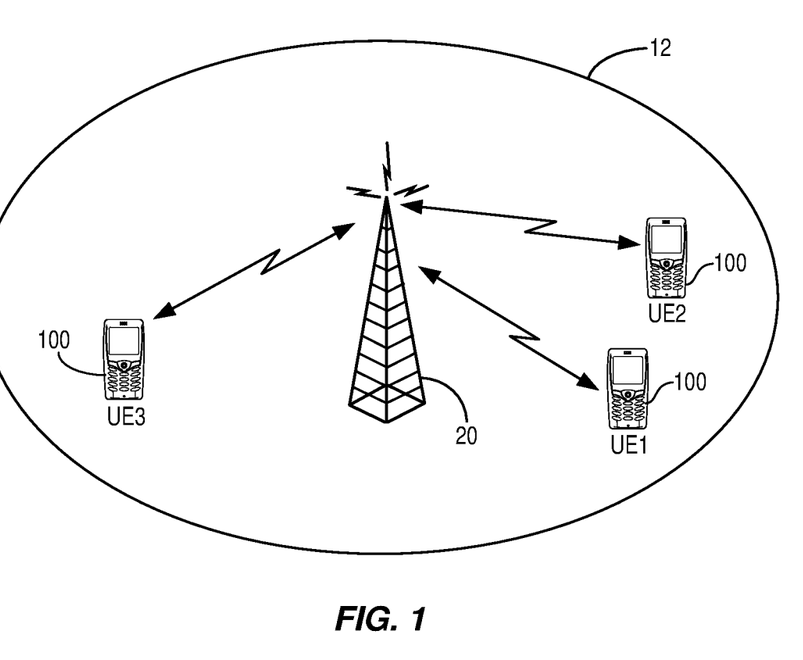
FIG. 1 illustrates an example radio communications network in which several of the presently disclosed techniques may be applied.

Referring now to the drawings, FIG. 1 illustrates an exemplary mobile communication network 10 for providing wireless communication services to user terminals 100. Three user terminals 100, which are referred to as "user equipment" or "UE" in LTE terminology, are shown in FIG. 1. The user terminals 100 may comprise, for example, cellular telephones, personal digital assistants, smart phones, laptop computers, handheld computers, or other devices with wireless communication capabilities. It should be noted that the terms "user terminal," "mobile station," or "mobile terminal," as used herein, refer to a terminal operating in a mobile communication network and do not necessarily imply that the terminal itself is mobile or moveable. Thus, the terms should be understood as interchangeable for the purposes of this disclosure and may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is generally referred to in LTE as an Evolved NodeB (eNodeB or eNB). One base station 20 may provide service in multiple geographic cell areas or sectors 12. The user terminals 100 receive signals from base station 20 on one or more downlink (DL) channels, and transmit signals to the base station 20 on one or more uplink (UL) channels. In particular, the UEs 100, whether in RRC_IDLE mode or RRC_CONNECTED mode, maintain synchronization to the illustrated base station 20, and monitor control channels transmitted by base station 20.

For illustrative purposes, several embodiments will be described in the context of a Long-Term Evolution (LTE) system. Those skilled in the art will appreciate, however, that the presently disclosed techniques may be more generally applicable to other wireless communication systems, including, for example, WiMax (IEEE 802.16) systems.

As noted above, the purpose of DRX mode is to allow the UE some sleep time, i.e., time during which it does not have to monitor the Physical Downlink Control Channel (PD-CCH) for new transmissions. A UE is typically configured with DRX so that when no traffic is ongoing for a certain time then the UE will enter a long DRX cycle. When in long DRX cycle, the UE listens on the PDCCH channel at regular intervals. In most cases, the UE will not be scheduled (i.e., receive an allocation of uplink or downlink resources) during one of those intervals, since once a UE is scheduled it is no longer in the long DRX cycle until another lengthy period of inactivity occurs. This means that when a UE is in long DRX cycle it is currently not performing any frequent reception or transmission of data.

Figure 2:
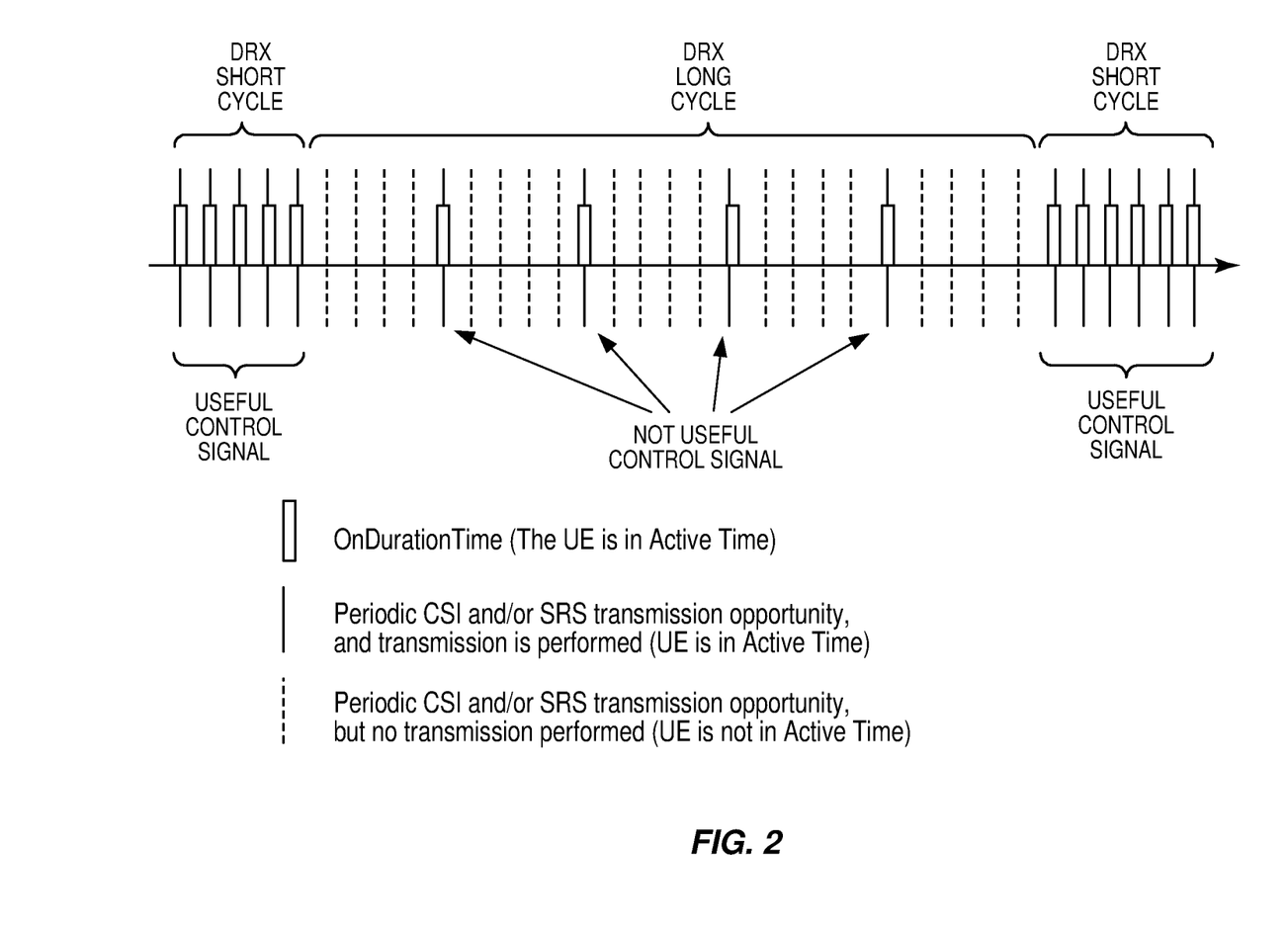
FIGS. 2 and 3 illustrate example scenarios in which unnecessary CSI and/or SRS transmissions occur while a user terminal is operating according to a long DRX cycle.

During normal operation of the UE, CSI and SRS are sent to the eNB to allow estimation of the downlink and uplink channels. One example of interaction between DRX and CSI/SRS transmission opportunities is shown in FIG. 2. As seen there, CSI/SRS transmission opportunities can be configured so that they align with Active Time intervals in DRX mode. In the illustrated example, a CSI/SRS transmission opportunity coincides with each OnDurationTime interval while the UE is in either the DRX short cycle or the DRX long cycle. At each of these OnDurationTime intervals, then, the CSI/SRS is transmitted. During the long cycle, there are fewer OnDurationTime instances, so that only every fifth CSI/SRS transmission opportunity is aligned with an OnDurationTime interval. Of course, CSI/SRS transmission opportunities could be configured to be less frequent, such as on every second OnDurationTime interval in the DRX short cycle.

Figure 3:
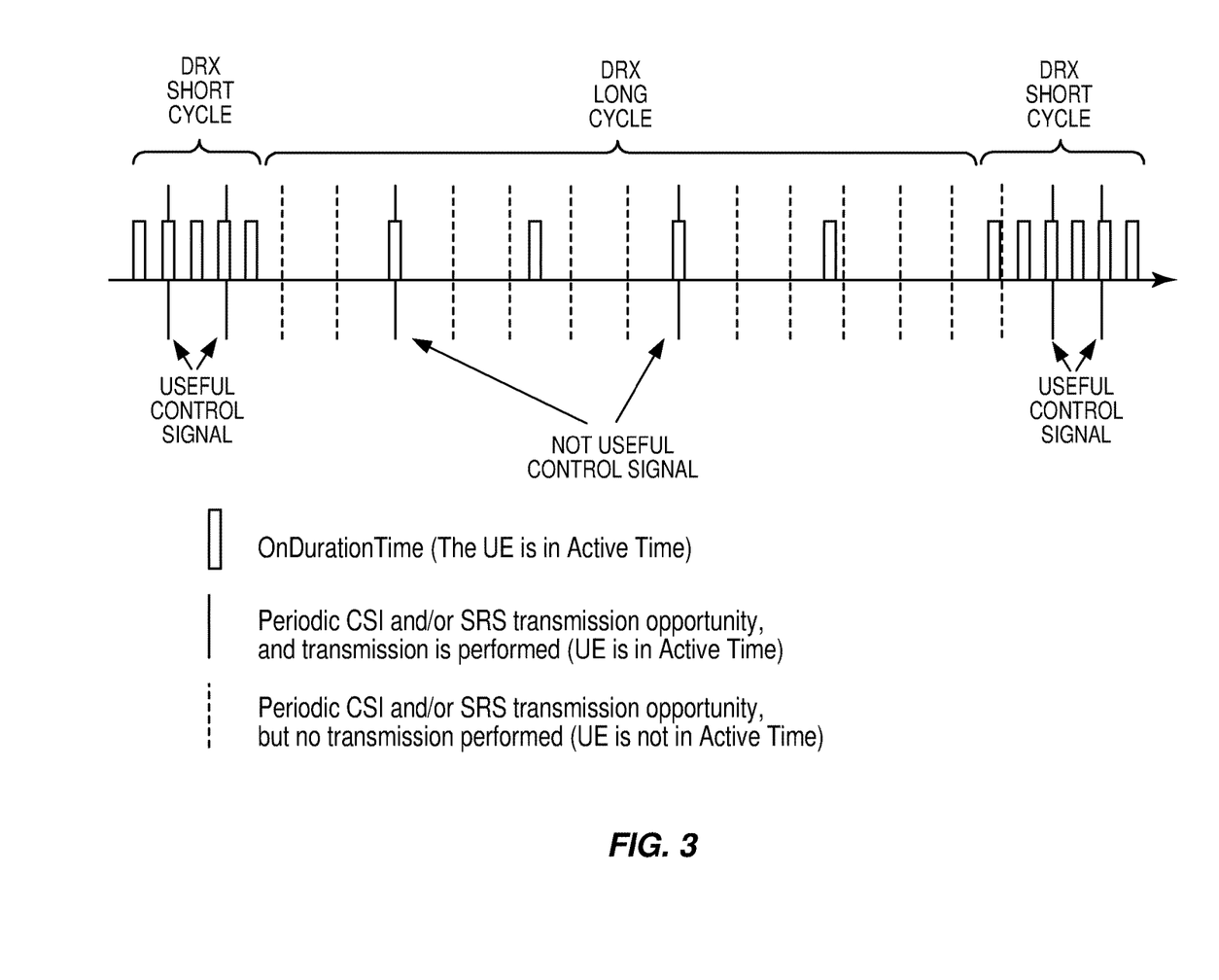

Another example of interaction between DRX and CSI/SRS transmission opportunities is shown in FIG. 3. In this case, the periodicity of the CSI/SRS transmission opportunities is not aligned with the periodicity of the DRX cycle times. In this case, some, but not all, of the CSI/SRS transmission opportunities while the UE is using the short cycle time are aligned with OnDurationTime intervals, and will thus result in transmission of CSI/SRS. Likewise, some, but not all, of the CSI/SRS transmission opportunities while the UE is using the short cycle time are also aligned with OnDurationTime intervals.

The CSI/SRS transmissions that take place during the DRX short cycle are generally useful to the eNB, since there is likely to be downlink or uplink traffic to or from the UE. On the other hand, the periodic reporting of CSI/SRS is less useful when traffic is not frequently ongoing for the UE, as is the case when the UE is using the DRX long cycle. If there are long gaps in the communication then the information provided by CSI/SRS is less useful since the channel condition information provided by the CSI/SRS will change frequently with the radio condition. The usefulness of the CSI/SRS reports thus decreases with time. Radio conditions may change very quickly and the time limit of a useful CSI/SRS report is counted in milliseconds. However, it is difficult to specify a definitive limit for when the information is no longer valid since it depends on many factors.

Another reason to avoid or reduce the transmission of CSI/SRS when traffic to or from the UE is infrequent is because in most cases the reports will be wasted, since the probability for actually using the reports in a subsequent communication before another periodic CSI/SRS report is sent is low.

The techniques detailed below may be used to avoid or reduce sending of periodic CSI and/or SRS signals when a UE is in DRX mode. Reducing the transmission of periodic CSI and/or SRS signals will improve the battery life of the UE and decrease unnecessary interference to transmissions to and/or from other UEs. According to some of the techniques described in detail below, a UE does not send periodic CSI/SRS at all when the UE is in long DRX cycle. In other embodiments, the sending of CSI and/or SRS during long DRX cycle is reduced, using one or more of several techniques that include delaying the periodic sending of CSI and/or SRS, reducing the rate of periodic transmission opportunities for CSI and/or SRS, and suppressing the periodic transmission of CSI and/or SRS after a defined delay.

In principle, one way to avoid the transmission of periodic CSI/SRS when a UE is in DRX mode is to configure the UE so that the CSI/SRS transmission times never coincide with the OnDuration time of Active Time. This can be done by configuring the UE in one of a few very specific fashions. For instance the UE can be configured so that the period of the CSI/SRS cycle is a multiple of the DRX Active Time short cycle and is offset from the DRX Active Time. Alternatively, the UE can be configured so that the DRX Active Time short cycle time is a multiple of the CSI/SRS cycle, and the CSI/SRS cycle offset is different from the DRX Active Time offset. In either case, In this case, since the periodic time for transmitting CSI/SRS never coincides with a DRX Active Time, periodic CSI/SRS will be effectively suppressed.

However, using this configuration approach has a number of disadvantages. For example, it usually is advantageous to align CSI/SRS reporting with Active Time, because this will allow a transmission of CSI/SRS in short DRX cycle when it is important to get this information. Another disadvantage is that the OnDuration time must be fairly short for this configuration to work, in practice, and it is not always the case (or desirable) that the OnDuration timer is set to a short value. Still another problem is that it can be difficult to configure CSI/SRS and DRX with the above restrictions in a real system, because the periodicity of CSI and SRS will usually be different. In addition, the periodicity may also depend on the specific type of traffic that is used. Still further, the DRX cycle for a UE may require different configurations depending on what type of traffic is currently ongoing, and the settings are usually a trade-off between latency requirements versus battery savings in the UE. Adding additional restrictions can interfere with this trade-off. Finally, in a system employing carrier aggregation, different periodic CSI/SRS reporting periodicities and offsets can be used to avoid collisions of periodic CSI/SRS reports. Having multiple periodic CSI/SRS configurations adds to above described difficulties.

Several better approaches are detailed below. In a first approach, when the UE changes from short DRX cycle to long DRX cycle it shall not transmit periodic CSI and/or SRS, beginning at a time X after the UE has entered long DRX cycle, and for as long as the UE remains in long DRX cycle. The time X could be specified in any of several different ways, such as:

a number of subframes;

a number of subframes during which the UE is in Active Time; or a number of times the UE enters an Active Time state after the long DRX cycle is entered.

Other possibilities exist, of course. Further, different times X might be specified for the cessation of periodic CSI and SRS transmissions. For example, a time X_CSI might specify the delay after which CSI reports are suppressed, while X_SRS specifies a corresponding delay before SRS reports are suppressed. In addition, it should be appreciated that the specification of X, X_CSI, and/or X_RS can be in absolute or relative terms, e.g., relative to another specified time interval.

In a variant of this approach, whenever the UE is in long DRX cycle it shall not transmit periodic CSI and/or SRS at all. It will be appreciated that this can be viewed as a special case of the above, where the time X is zero.

In a variant of either of the above approaches, when the UE has stopped sending periodic CSI and/or SRS due to entering into a long DRX cycle and when the UE subsequently changes from long DRX cycle to short DRX cycle, the UE shall start transmitting periodic CSI/SRS again, according to the RRC-configured repetition period, beginning at a time Y after the UE enters the short DRX cycle and for so long as the UE remains in the short DRX cycle. Again, different times Y might be specified for the re-starting of periodic CSI and SRS transmissions, e.g., Y_CSI and Y_SRS. Likewise, the time Y can be specified in any of several different ways, such as:
 a number of subframes;
 a number of subframes during which the UE is in Active Time; or
 a number of times the UE enters an Active Time state after the short DRX cycle is entered.

Figure 4:
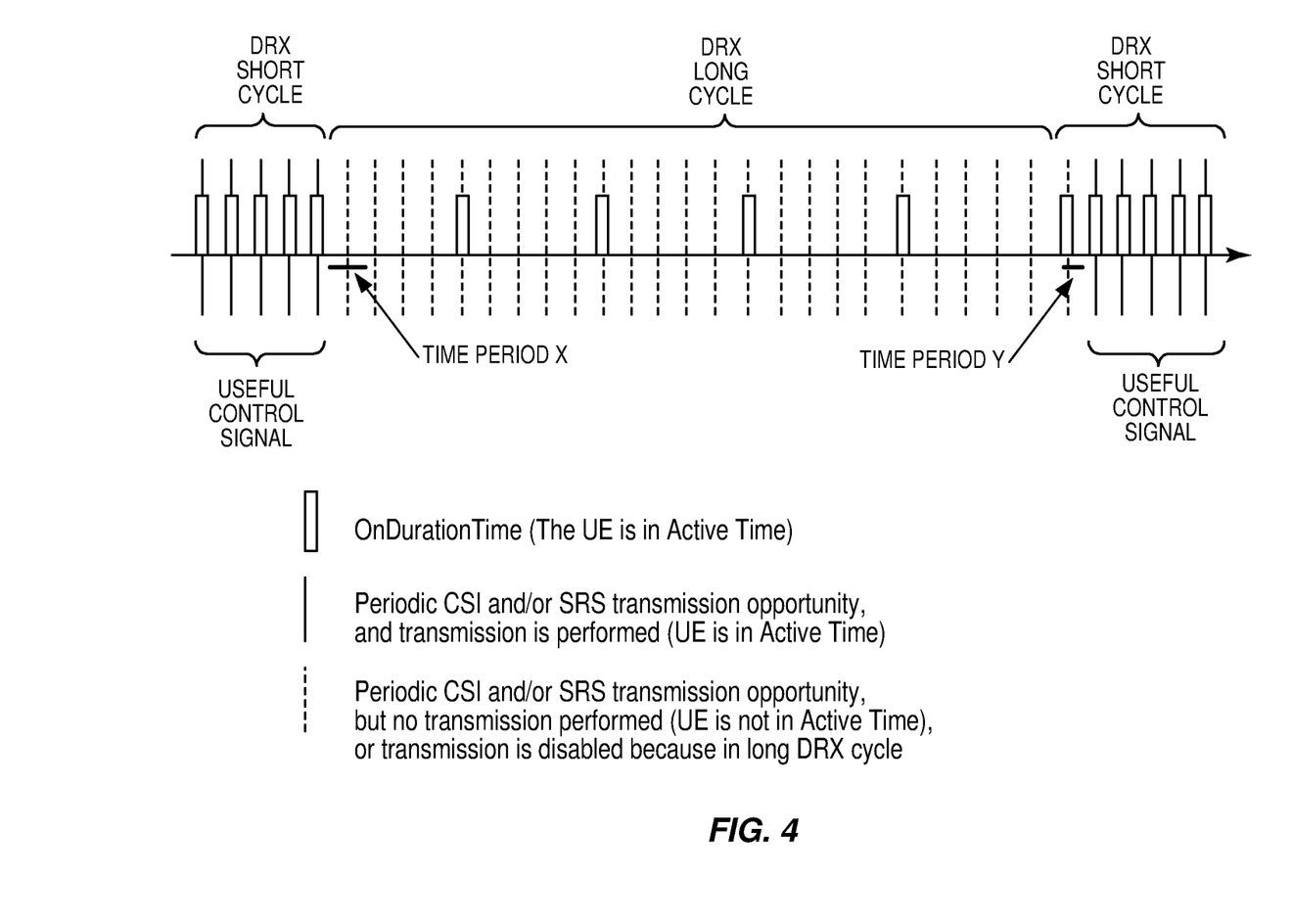
FIGS. 4 and 5 illustrate scenarios in which CSI and/or SRS transmissions are reduced and/or suppressed according to the techniques detailed herein.

FIG. 4 illustrates an example scenario in which the preceding techniques are employed. At the left-hand side of FIG. 4, the UE is using DRX short cycle. The CSI and/or SRS transmission opportunities are aligned with OnDurationTime intervals, so that the CSI and/or SRS are transmitted at each opportunity. Upon entering DRX long cycle, however, transmission of CSI and/or SRS is suppressed, after a time period X. As a result, CSI and SRS are not transmitted at all during the long cycle interval, even though CSI/SRS transmission opportunities coincide with OnDurationTime intervals on several occasions.

After returning to the use of the DRX short cycle, as shown at the right-hand side of FIG. 4, transmission of CSI/SRS during OnDurationTime intervals resumes. However, these transmissions only resume following a delay Y, after the use of the short cycle is entered. In the illustrated example, this delay Y means that a first CSI/SRS transmission opportunity is not used, even though it aligns with an OnDurationTime interval. Note that in the illustrated scenario, no distinction is made between SRS and CSI transmissions. In some embodiments, however, the time periods X and/or Y may be set differently for CSI and SRS transmissions. Likewise, as noted above, the use of delays having lengths X and Y represents a general case, where either X or Y, or both, may be zero.

Figure 5:
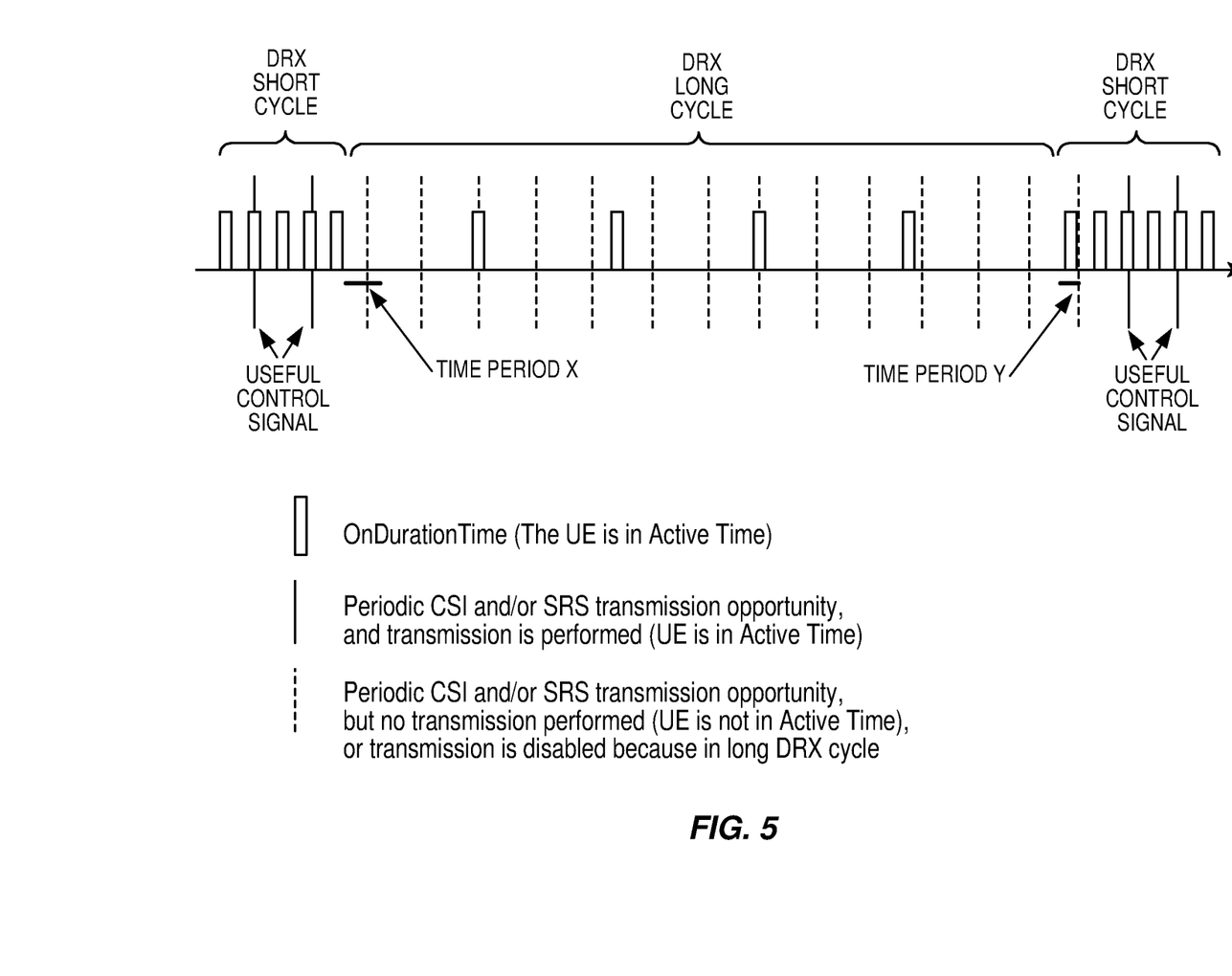

FIG. 5 illustrates another example scenario in which the preceding techniques are employed. In this example, the periodicity of the CSI/SRS transmission opportunities is not aligned with the OnDurationTime intervals in DRX mode. At the left-hand side of FIG. 5, the UE is using DRX short cycle. Two of the CSI and/or SRS transmission opportunities are aligned with OnDurationTime intervals, so that the CSI and/or SRS are transmitted at these opportunities. Upon entering DRX long cycle, however, transmission of CSI and/or SRS is suppressed, after a time period X. As a result, CSI and SRS are not transmitted at all during the long cycle interval, even though CSI/SRS transmission opportunities coincide with OnDurationTime intervals on two occasions.

After returning to the use of the DRX short cycle, as shown at the right-hand side of FIG. 5, transmission of CSI/SRS during OnDurationTime intervals resumes. Again, however, these transmissions only resume following a delay Y, after the use of the short cycle is entered. In the illustrated example, this delay Y means that a first CSI/SRS transmission opportunity would not have been used even if it was aligned with an OnDurationTime interval. Again, note that in the illustrated scenario, no distinction is made between SRS and CSI transmissions. In some embodiments, however, the time periods X and/or Y may be set differently for CSI and SRS transmissions. Likewise, as noted above, the use of delays having lengths X and Y represents a general case, where either X or Y, or both, may be zero.

In some embodiments, behavior according to any of the above approaches is selectively configurable by the network. In other words, the UE is configured, e.g., by RRC signaling, in a mode that enables one or more of the methods specified above. When this mode is not configured (i.e., when this mode is switched off), the UE will not behave differently when in short DRX cycle or in long DRX cycle.

In still another variant, the UE uses two different sets of periodicities for transmitting periodic CSI and/or SRS when in long DRX cycles, compared to short DRX cycles. When the UE is in short DRX cycle, for example, the UE transmits CSI with a periodicity P1 but while in long DRX cycle the UE transmits CSI with a periodicity P2. Likewise, the UE transmits periodic SRS with a periodicity P3 when in short DRX cycle, but while in long DRX cycle the UE transmits SRS with a periodicity P4.

In an alternative version of this last approach the UE, when going from long to short DRX cycle, continues to use P2 as periodicity for periodic CSI and P4 as periodicity for periodic SRS for a time T3 after the UE enters the short DRX cycle. After time T3, the UE begins to use P1 as periodicity for periodic CSI and P3 as periodicity for periodic SRS. In some cases, different starting times, e.g., times T3_CSI and T3_SRS might be used to begin the changes in periodicity for CSI and SRS, respectively.

Similarly, when going from short to long DRX cycle, the UE in this example continues to use P1 as periodicity for periodic CSI and P3 as periodicity for periodic SRS for a time T4 after the UE enters the long DRX cycle, after which the UE uses P2 as the periodicity for periodic CSI and P4 as the periodicity for periodic SRS. Again, in some embodiments different times might be used for CSI and SRS, e.g., times T4_CSI and T4_SRS.) The times T3 and T4 could be specified as a number of subframes, for example, or a number of times the UE enters Active Time-state after the long DRX cycle has been entered.

In some cases, any or all of the values described above, namely X, Y, T1, T2, T3, T4, P1, P2, P3 and P4 may be signaled to the UE by the network or may be configured by the UE itself, i.e., according to stored values. In some embodiments, one or more of these values may be changed during the lifetime of a UE, e.g., to adapt to different situations, UE capabilities, or other different situations. In other embodiments, these values may be fixed, e.g., taking on predefined values according to an industry standard.

Figure 6:
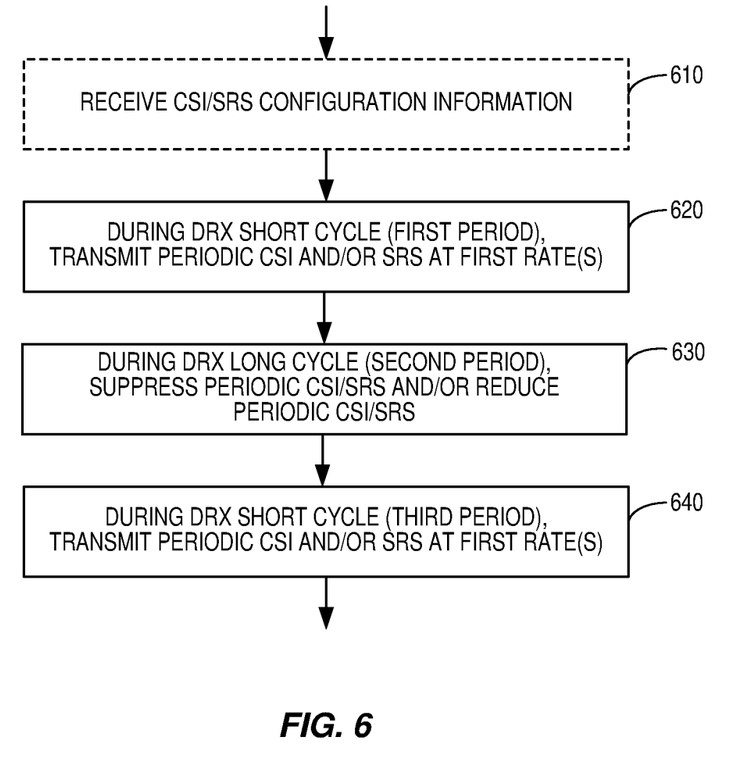
FIG. 6 is a process flow diagram illustrating an example method for transmitting CSI and/or SRS.

Several examples of techniques for transmitting CSI or SRS have been described. It should be appreciated that FIG. 6 is a process flow diagram illustrating a generalized method suitable for implementation in a user terminal, according to the techniques described above.

As shown at block 620, the illustrated process includes periodically transmitting CSI or SRS, or both, according to corresponding periodic CSI transmission opportunities or periodic SRS transmission opportunities, or both, during a first period in which the user terminal is operating according to a short DRX cycle. As shown at block 630, in a second period immediately following the first period and during which the user terminal is operating according to a long DRX cycle, the user terminal reduces or suppresses periodic transmissions of CSI or SRS or both. As was detailed above, this reducing or suppressing of periodic transmissions may include one or more of: (i) suppressing periodic transmission of CSI or SRS or both; (ii) suppressing periodic transmission of CSI or SRS or both, after a first delay time or first delay times; (iii) periodically transmitting CSI or SRS or both according to a reduced rate of periodic CSI transmission opportunities or reduced rate of periodic SRS transmission opportunities or both; or (iv) reducing the rate of transmission of CSI or SRS or both, after a second delay time or second delay times. A combination of two or more of these approaches may be used to reduce the rate of transmission of CSI or SRS, or both.

In some embodiments, the operations shown in blocks 620 and/or 630 are preceded by the receiving of CSI/SRS configuration information. This is shown at block 610, which is outlined with a dashed line to indicate that this operation is "optional," in the sense that it may not appear in all embodiments, or in all circumstances. This CSI/SRS configuration information may specify one or more of the following, for example: a delay time for starting periodic CSI transmission opportunities during DRX long cycles; a delay time for starting periodic SRS transmission opportunities during DRX long cycles; a delay time for starting periodic CSI transmission opportunities during DRX short cycles; a delay time for starting periodic SRS transmission opportunities during DRX short cycles; a period for periodic CSI transmission opportunities, for use during DRX long cycles; a period for periodic SRS transmission opportunities, for use during DRX long cycles; a period for periodic CSI transmission opportunities, for use during DRX short cycles; and a period for periodic SRS transmission opportunities, for use during DRX short cycles. In some cases, the configuration information received by the user terminal may include or consist of signaling that indicates that reduced CSI or SRS transmission should be enabled, where the user terminal operation during the second period is responsive to said signaling.

In some embodiments, periodic transmission of CSI or SRS or both is suppressed during the second period, beginning at a specified time X after the user terminal has entered the long cycle and continuing for as long as the user terminal remains in the long cycle. In some of these embodiments, periodic transmission of CSI is suppressed beginning at the specified time X after the user terminal has entered the long cycle, while periodic transmission of SRS is suppressed beginning at a specified time X_SRS after the user terminal has entered the long cycle, where X_SRS differs from X The specified time X and/or X_SRS may be specified in terms of at least one of the following, for example: a number of subframes; a number of subframes during which the user terminal is in an Active Time state; and a number of times that the user terminal is in an Active Time state after entering the long cycle.

As shown at block 640, the user terminal returns to operation according to the short DRX cycle in a third period immediately following the second period. During this third period, the user terminal periodically transmits CSI or SRS, or both, according to corresponding periodic CSI transmission opportunities or periodic SRS transmission opportunities, or both, at a rate or rates used in the first period. In some embodiments, the periodic transmission of CSI or SRS or both, during the third period, is delayed by a second delay time or second delay times. For example, the user terminal may begin periodic transmission of CSI or SRS, or both, beginning at a specified time Y after entering the short cycle and for as long as the user terminal remains in the short cycle. In some of these embodiments, periodic transmission of CSI begins at the specified time Y after the user terminal has entered the short cycle, while periodic transmission of SRS begins at a specified time Y_SRS after the user terminal has entered the short cycle, where Y_SRS differs from Y. The specified time Y and/or Y_SRS may be specified in terms of at least one of the following, for example: a number of subframes; a number of subframes during which the user terminal is in an Active Time state; and a number of times that the user terminal is in an Active Time state after entering the short cycle.

In any of the embodiments described above, CSI may be transmitted at a first periodicity during the second period and at a second periodicity, differing from the first periodicity, during the third period. Likewise, SRS may be transmitted at a third periodicity during the second period and at a fourth periodicity, differing from the third periodicity, during the third period.

Figure 7:
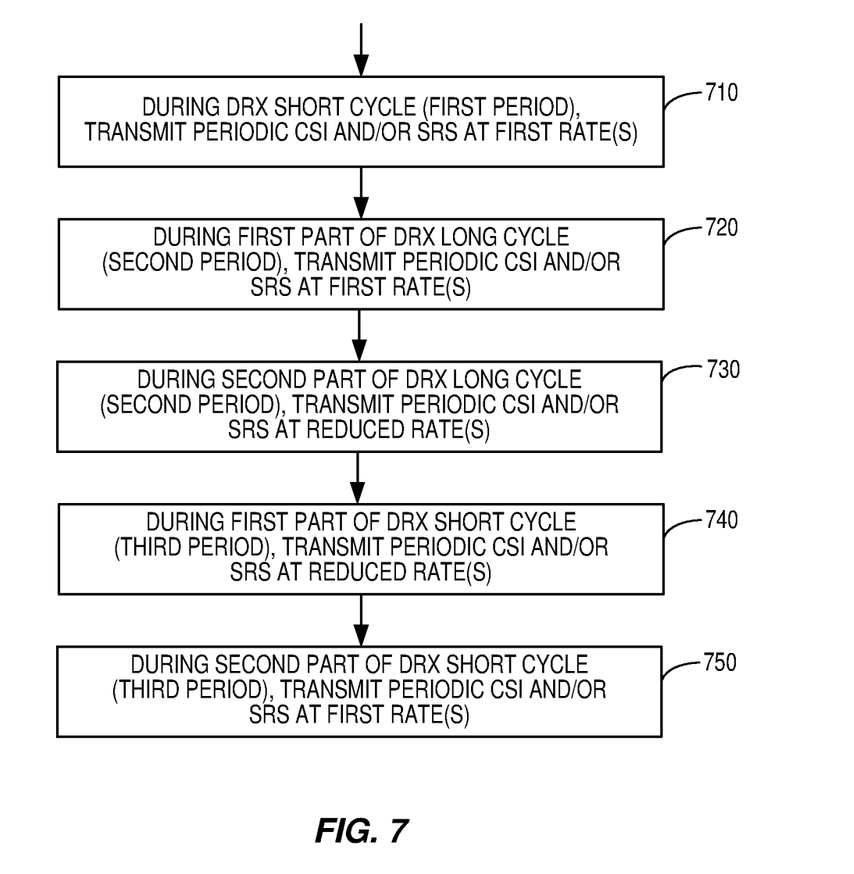
FIG. 7 is a process flow diagram illustrating another example method for transmitting CSI and/or SRS.

FIG. 7 illustrates a variant of the technique illustrated generally in FIG. 6. As shown at block 710, this example process includes periodically transmitting CSI or SRS, or both, according to corresponding periodic CSI transmission opportunities or periodic SRS transmission opportunities, or both, during a first period in which the user terminal is operating according to a short DRX cycle. These transmissions take place at a first rate or rates, depending on whether the CSI and SRS transmission opportunities are scheduled with the same periodicity. Note that block 710 of FIG. 7 corresponds to block 620 of FIG. 6.

As shown at block 720, the reducing or suppressing of periodic transmissions in the second period comprises periodically transmitting CSI or SRS, or both, during a first part of the second period, at a rate or rates previously used in the first period. In a second portion of the second period, the user terminal periodically transmits CSI or SRS, or both, at a reduced rate or rates compared to the rate or rates previously used in the first period. This is shown at block 730. Note that the operations shown at blocks 720 and 730 of FIG. 7 represent one example of the suppression and/or reducing of periodic CSI/SRS shown at block 630 of FIG. 6.

As shown at block 740, in a third period immediately following the second period and during which the user terminal is again operating according to a short DRX cycle, the user terminal periodically transmits CSI or SRS, or both, at the reduced rate or rates for a first portion of the third period. As shown at block 750, in a second portion of the third period, the user terminal returns to periodically transmitting CSI or SRS, or both, at the rate or rates previously used in the first period.

Figure 8:
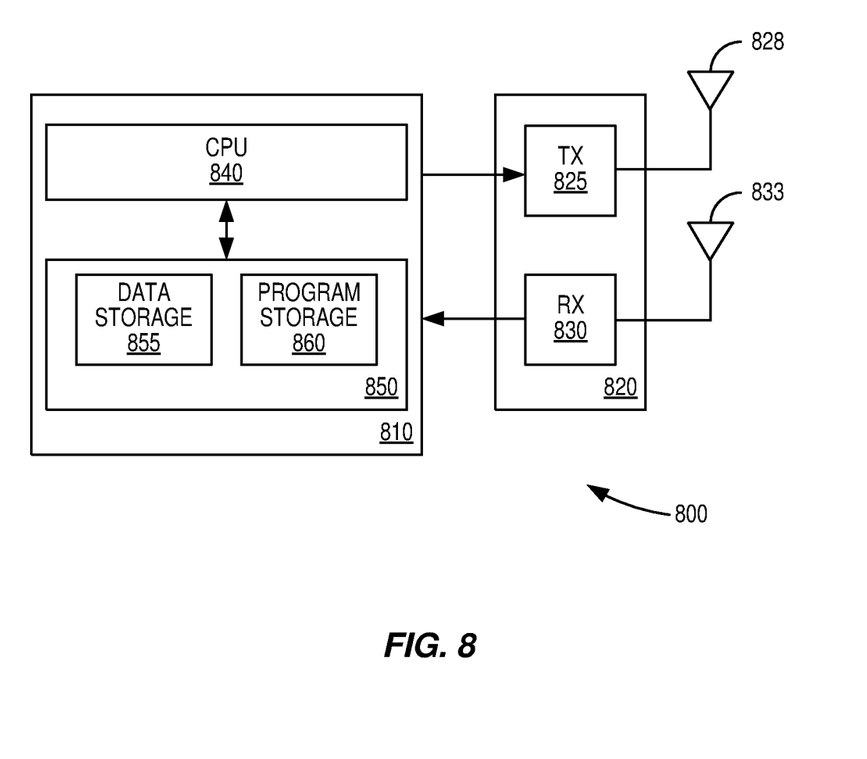
FIG. 8 is a block diagram illustrating components of an example user terminal adapted according to the techniques described herein.

Several of the techniques described above can be implemented in connection with a user terminal, such as a user equipment (UE) configured according to 3GPP specifications for LTE and/or LTE-Advanced. FIG. 8 illustrates features of an example user terminal 1900 according to several embodiments of the techniques disclosed herein.

User terminal 1900 comprises a transceiver 1910 for communicating with one or more base stations as well as a processing circuit 1910 for processing the signals transmitted and received by the transceiver 1920. Transceiver 1920 includes a transmitter 1925 coupled to one or more transmit antennas 1928 and receiver 1930 coupled to one or more receive antennas 1933. The same antenna(s) 1928 and 1933 may be used for both transmission and reception. Receiver 1930 and transmitter 1925 use known radio processing and signal-processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the presently disclosed techniques, additional details are not shown here.

Processing circuit 1910 comprises one or more processors 1940, hardware, firmware or a combination thereof, coupled to one or more memory devices 1950 that make up a data storage memory 1955 and a program storage memory 1960. Memory 1950 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices are well known and are unnecessary to a full understanding of the presently disclosed techniques, additional details are not shown here.

Typical functions of the processing circuit 1910 include modulation and coding of transmitted signals and the demodulation and decoding of received signals. In several embodiments of the techniques disclosed herein, processing circuit 1910 is adapted, using suitable program code stored in program storage memory 1960, for example, to carry out one of the techniques described above for handling CSI and/or SRS transmissions during DRX. Of course, it will be appreciated that not all of the steps of these techniques are necessarily performed in a single microprocessor or even in a single module.

Examples of several embodiments of the presently disclosed techniques have been described in detail herein, with reference to the attached illustrations of specific embodiments. Because it is not possible, of course, to describe every conceivable combination of components or techniques, those skilled in the art will appreciate that the methods, apparatus, and systems taught herein for transmitting CSI and/or SRS in a communications network can be implemented in other ways than those specifically set forth herein without departing from essential characteristics of the techniques and apparatus that have been described. Modifications and other embodiments will come to mind to one skilled in the art having the benefit of the teachings presented in the foregoing description and the associated drawings. Therefore, it is to be understood that other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a user terminal, for transmitting channel state information (CSI) or sounding reference signals (SRS) or both, the method comprising:
    periodically transmitting CSI or SRS, or both, according to corresponding periodic CSI transmission opportunities or periodic SRS transmission opportunities, or both, during a first period in which the user terminal is operating according to a short discontinuous receive (DRX) cycle; and
    in a second period immediately following the first period and during which the user terminal is operating according to a long DRX cycle, reducing or suppressing periodic transmissions of CSI or SRS or both, the reducing or suppressing beginning at a specified time X determined based on a number of times the user terminal is in an Active Time state after entering the long DRX cycle.

2. The method of claim 1, wherein said reducing or suppressing periodic transmissions comprises at least one of:
    (i) suppressing periodic transmission of CSI or SRS or both;
    (ii) suppressing periodic transmission of CSI or SRS or both, after a first delay time or first delay times;
    (iii) periodically transmitting CSI or SRS or both according to a reduced rate of periodic CSI transmission opportunities or reduced rate of periodic SRS transmission opportunities or both;
    (iv) reducing the rate of transmission of CSI or SRS or both, after a second delay time or second delay times; and
    (v) reducing the rate of transmission of CSI or SRS or both using a combination of two or more of (i), (ii), (iii), and (iv).

3. The method of claim 1, further comprising receiving configuration information prior to at least said second period, the configuration information specifying one or more of:
    a delay time for starting periodic CSI transmission opportunities during DRX long cycles;
    a delay time for starting periodic SRS transmission opportunities during DRX long cycles;
    a delay time for starting periodic CSI transmission opportunities during DRX short cycles;
    a delay time for starting periodic SRS transmission opportunities during DRX short cycles;
    a period for periodic CSI transmission opportunities, for use during DRX long cycles;
    a period for periodic SRS transmission opportunities, for use during DRX long cycles;
    a period for periodic CSI transmission opportunities, for use during DRX short cycles; and
    a period for periodic SRS transmission opportunities, for use during DRX short cycles.

4. The method of claim 1, comprising, in the second period, suppressing periodic transmission of CSI or SRS or both, beginning at a specified time X after the user terminal has entered the long DRX cycle and continuing for as long as the user terminal remains in the long DRX cycle.

5. The method of claim 4, wherein the specified time X is further specified in terms of at least one of the following:
    a number of subframes; and
    a number of subframes during which the user terminal is in an Active Time state.

6. The method of claim 4, wherein periodic transmission of CSI is suppressed beginning at the specified time X after the user terminal has entered the long DRX cycle, the method further comprising suppressing periodic transmission of SRS beginning at a specified time X_SRS after the user terminal has entered the long DRX cycle, wherein X_SRS differs from X.

7. The method of claim 1, further comprising, in a third period immediately following the second period and during which the user terminal is again operating according to a short DRX cycle, periodically transmitting CSI or SRS, or both, according to corresponding periodic CSI transmission opportunities or periodic SRS transmission opportunities, or both, at a rate or rates used in the first period.

8. The method of claim 7, wherein the periodic transmission of CSI or SRS or both, during the third period, is delayed by a second delay time or second delay times.

9. The method of claim 1, further comprising, in a third period immediately following the second period and during which the user terminal is again operating according to the short DRX cycle, beginning periodic transmission of CSI or SRS, or both, beginning at a specified time Y after entering the short DRX cycle and for as long as the user terminal remains in the short DRX cycle.

10. The method of claim 9, wherein the periodic transmission of CSI begins at the specified time Y after the user terminal has entered the short DRX cycle, the method further comprising beginning the periodic transmission of SRS beginning at a specified time Y_SRS after the user terminal has entered the short DRX cycle, wherein Y_SRS differs from Y.

11. The method of claim 9, wherein the specified time Y is specified in terms of at least one of the following:
   a number of subframes;
   a number of subframes during which the user terminal is in an Active Time state; and
   a number of times that the user terminal is in the Active Time state after entering the short DRX cycle.

12. The method of claim 9, wherein CSI is transmitted at a first periodicity during the second period and at a second periodicity, differing from the first periodicity, during the third period.

13. The method of claim 9, wherein SRS is transmitted at a third periodicity during the second period and at a fourth periodicity, differing from the third periodicity, during the third period.

14. The method of claim 1, comprising, in a first portion of the second period, periodically transmitting CSI or SRS, or both, at a rate or rates previously used in the first period and, in a second portion of the second period, periodically transmitting CSI or SRS, or both, at a reduced rate or rates compared to the rate or rates previously used in the first period.

15. The method of claim 14, further comprising, in a third period immediately following the second period and during which the user terminal is again operating according to a short DRX cycle, periodically transmitting CSI or SRS, or both, at the reduced rate or rates for a first portion of the third period, and, in a second portion of the third period, periodically transmitting CSI or SRS, or both, at the rate or rates previously used in the first period.

16. The method of claim 1, further comprising receiving, prior to at least said second period, signaling that indicates that reduced CSI or SRS transmission should be enabled, wherein the user terminal operation during the second period is responsive to said signaling.

17. A user terminal apparatus, comprising a transceiver adapted to communicate with one or more base stations and further comprising a processing circuit adapted to process signals transmitted and received by the transceiver, wherein the processing circuit is further adapted to:
   periodically transmit channel-state information (CSI) or sounding reference signals (SRS) or both, according to corresponding periodic CSI transmission opportunities or periodic SRS transmission opportunities, or both, during a first period in which the user terminal apparatus is operating according to a short discontinuous receive (DRX) cycle; and
   in a second period immediately following the first period and during which the user terminal apparatus is operating according to a long DRX cycle, reducing or suppressing periodic transmissions of CSI or SRS or both, the reducing or suppressing beginning at a specified time X determined on a number of times the user terminal is in an Active Time state after entering the long DRX cycle.

18. A method, in a user terminal, for transmitting channel state information (CSI) or sounding reference signals (SRS) or both, the method comprising:
   periodically transmitting CSI or SRS, or both, according to corresponding periodic CSI transmission opportunities or periodic SRS transmission opportunities, or both, during a first period in which the user terminal is operating according to a short discontinuous receive (DRX) cycle;
   in a second period immediately following the first period and during which the user terminal is operating according to a long DRX cycle, reducing or suppressing periodic transmissions of CSI or SRS or both; and
   in a first portion of the second period, periodically transmitting CSI or SRS, or both, at a rate or rates previously used in the first period and, in a second portion of the second period, periodically transmitting CSI or SRS, or both, at a reduced rate or rates compared to the rate or rates previously used in the first period.

* * * * *